(12) United States Patent
Li

(10) Patent No.: US 10,365,607 B2
(45) Date of Patent: Jul. 30, 2019

(54) HOLOGRAM DISPLAY DEVICE

(71) Applicant: BOE TECHNOLOGY GROUP CO., LTD., Beijing (CN)

(72) Inventor: Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 39 days.

(21) Appl. No.: 15/681,738

(22) Filed: Aug. 21, 2017

(65) Prior Publication Data

US 2018/0052424 A1    Feb. 22, 2018

(30) Foreign Application Priority Data

Aug. 22, 2016  (CN) .......................... 2016 1 0701844

(51) Int. Cl.
*G03H 1/10* (2006.01)
*G06F 3/01* (2006.01)
(Continued)

(52) U.S. Cl.
CPC ............... *G03H 1/10* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS

2011/0149018 A1\* 6/2011 Kroll ........................ G03H 1/02
                                                        348/40
2011/0149359 A1    6/2011 Leister
(Continued)

FOREIGN PATENT DOCUMENTS

CN         1175308 A     3/1998
CN       102523459 A     6/2012
(Continued)

OTHER PUBLICATIONS

First Chinese office action dated Apr. 25, 2017 for corresponding CN application 201610701844.8 with English translation attached.
(Continued)

*Primary Examiner* — Jennifer D. Carruth
(74) *Attorney, Agent, or Firm* — Nath, Goldberg & Meyer; Joshua B. Goldberg; Daniel Bissing

(57) ABSTRACT

The present disclosure provides a hologram display device including a spatial light modulator, a lens assembly, and a plurality of backlights. The plurality of backlights are provided at a light incident side of the spatial light modulator, and the lens assembly is provided between the plurality of backlights and the spatial light modulator. The plurality of backlights are configured to emit light having different directions towards the lens assembly, respectively, the lens assembly is configured to guide received light having different directions to the spatial light modulator, and the spatial light modulator is configured to form images at different positions at a light emergent side of the spatial light modulator according to the light having different directions from the lens assembly, respectively.

14 Claims, 6 Drawing Sheets

(51) Int. Cl.
   *G03H 1/02*      (2006.01)
   *G02B 27/22*     (2018.01)

(52) U.S. Cl.
   CPC . *G02B 27/2228* (2013.01); *G03H 2001/0212* (2013.01); *G03H 2210/30* (2013.01); *G03H 2210/56* (2013.01); *G03H 2226/05* (2013.01); *G06F 2203/04802* (2013.01)

(56) References Cited

U.S. PATENT DOCUMENTS

2015/0023662 A1* 1/2015 Suzuki ............... H04J 14/02
                                                  398/48
2015/0268479 A1* 9/2015 Woodgate ......... G02B 27/2214
                                                  349/15

FOREIGN PATENT DOCUMENTS

| CN | 202931496 U  | 5/2013  |
| CN | 103246076 A  | 8/2013  |
| CN | 103365196 A  | 10/2013 |
| CN | 103384854 A  | 11/2013 |
| CN | 104618706 A  | 5/2015  |
| JP | 2006113182 A | 4/2006  |

OTHER PUBLICATIONS

Second Chinese office action dated Aug. 11, 2017 for corresponding CN application 201610701844.8 with English translation attached.
Chinese office action dated Dec. 13, 2017 for corresponding CN application 201610701844.8 with English translation attached.

* cited by examiner

HOLOGRAM DISPLAY DEVICE

CROSS-REFERENCE TO RELATED APPLICATIONS

The present application claims the priority of Chinese Patent Application No. 201610701844.8, filed on Aug. 22, 2016, the contents of which are incorporated herein in their entirety by reference.

TECHNICAL FIELD

The present disclosure relates to the field of display technology, and in particular, relates to a hologram display device.

BACKGROUND

Holography is a recording and reproducing technology to record and reproduce a real three-dimensional image of an object by using the principles of interference and diffraction of light. A first step of the holography is to record (or photograph) light wave information of an object by using the principle of interference. An object to be photographed generates a diffuse reflection object beam upon being irradiated by a split beam of a laser beam, and another split beam of the laser beam irradiates a holographic film as a reference beam to meet and interfere with the object beam, so that a phase and an amplitude of each point on the object beam (i.e., a light wave of the object) are transformed into a spatially varying intensity, and the light wave of the object is completely recorded by using a contrast and an interval between interference fringes. A second step of the holography is to reproduce the light wave information of the object by using the principle of diffraction.

During the process of reproduction (i.e., image formation), upon being irradiated by a coherent laser beam (e.g., the same laser beam as the reference beam), a diffraction light wave of a linearly recorded sine-type hologram may generally provide two images, which are an original image (also known as an initial image) and a conjugate image. A reproduced image has a true three-dimensional sense and a real visual effect.

A digital hologram display device realizes holographic stereoscopic display by means of a photoelectric modulation device. However, an existing digital hologram display device can display only one hologram screen and the viewable region thereof is small, which is not suitable for viewing by a plurality of viewers at the same time.

SUMMARY

Embodiments of the present disclosure provide a hologram display device, which is capable of displaying a plurality of images at different positions, and has an increased range of each viewable region.

Some embodiments of the present disclosure provide a hologram display device, including a spatial light modulator, a lens assembly, and a plurality of backlights, wherein the plurality of backlights are provided at a light incident side of the spatial light modulator, the lens assembly is provided between the plurality of backlights and the spatial light modulator, the plurality of backlights are configured to emit light having different directions towards the lens assembly, respectively, the lens assembly is configured to guide received light having different directions to the spatial light modulator, and the spatial light modulator is configured to form images at different positions at a light emergent side of the spatial light modulator according to the light having different directions from the lens assembly, respectively.

In an embodiment, the lens assembly includes a plurality of first lenses having a one-to-one correspondence to the plurality of backlights and a second lens provided between the plurality of first lenses and the spatial light modulator, each first lens is configured to guide parallel surface coherent light emitted from a corresponding backlight to a predetermined position on the second lens, and the second lens is configured to guide light transmitted through respective first lenses to the spatial light modulator.

In an embodiment, each backlight includes a light emitting assembly configured to emit parallel surface coherent light towards the spatial light modulator.

In an embodiment, each backlight further includes a shutter provided between the light emitting assembly of the backlight and the first lens corresponding to the backlight.

In an embodiment, the hologram display device further includes a controller, wherein an output terminal of the controller is connected to control terminals of a plurality of shutters, respectively, to control the plurality of shutters to be turned on in sequence.

In an embodiment, each light emitting assembly includes a laser and a beam expander, an emitting terminal of the laser faces a light incident surface of the beam expander, and a light emergent surface of the beam expander faces the shutter.

In an embodiment, the hologram display device further includes a processor and a plurality of data sources each providing an image signal, wherein the plurality of data sources have a one-to-one correspondence to the plurality of backlights, output terminals of the plurality of data sources are connected to a plurality of input terminals of the processor, respectively, a first output terminal of the processor is connected to an input terminal of the spatial light modulator, a second output terminal of the processor is connected to an input terminal of the controller, and the processor is configured to transform an image signal provided by a data source into coded information and to send the coded information to the spatial light modulator at the time when a corresponding one of the backlights irradiates the spatial light modulator.

In an embodiment, the hologram display device further includes at least one rotation controller and at least one face tracker, wherein the rotation controller is configured to adjust a light outgoing direction of at least one of the backlights, each of the at least one face tracker corresponds to a predetermined region of the light emergent side of the spatial light modulator, and is configured to determine a position of a face of a viewer in the predetermined region and to send information of the position of the face of the viewer to the rotation controller, after receiving the information of the position, the rotation controller controls at least one of the backlights to rotate, so that a light outgoing direction of the at least one of the backlights matches the position of the face of the viewer detected by each of the at least one face tracker.

In an embodiment, the hologram display device further includes a plurality of rotation controllers and a plurality of face trackers, wherein each of the backlights corresponds to one of the rotation controllers and one of the face trackers, each of the rotation controllers is configured to, after receiving the information of the position sent by a corresponding face tracker, control a corresponding backlight to rotate, so that a light outgoing direction of the corresponding backlight matches the position of the face of the viewer detected by the corresponding face tracker.

In an embodiment, the at least one face tracker is embedded in the spatial light modulator.

In an embodiment, the hologram display device further includes at least one rotation controller and at least one eye tracker, wherein the rotation controller is configured to adjust a light outgoing direction of at least one of the backlights, each of the at least one eye tracker corresponds to a predetermined region of the light emergent side of the spatial light modulator, and is configured to determine positions of eyes of a viewer in the predetermined region and to send information of the positions of the eyes of the viewer to the rotation controller, after receiving the information of the positions, the rotation controller controls at least one of the backlights to rotate, so that the at least one of the backlights emit two light rays which alternately enter into the right and left eyes of the viewer, respectively, and a time interval between the light rays which enter into the right and left eyes of the viewer is in a predetermined range.

In an embodiment, the hologram display device further including a plurality of rotation controllers and a plurality of eye trackers, wherein each of the backlights corresponds to one of the rotation controllers and one of the eye trackers, each of the rotation controllers is configured to, after receiving the information of the positions sent by a corresponding eye tracker, control a corresponding backlight to rotate, so that the corresponding backlight alternately emit two light rays which enter into the right and left eyes of the viewer, respectively.

In an embodiment, the at least one eye tracker is embedded in the spatial light modulator.

In an embodiment, a refresh frequency of the spatial light modulator and a frequency at which each of the backlights irradiates the spatial light modulator satisfy an equation of $$f=F/n;$$

where f is the frequency at which each of the backlights irradiates the spatial light modulator, F is the refresh frequency of the spatial light modulator, and n is a number of the plurality of backlights.

In an embodiment, the refresh frequency of the spatial light modulator is 120 Hz.

In an embodiment, the number of the plurality of backlights is three.

Since the light outgoing directions of the plurality of backlights are different from each other, light emitted from the plurality of backlights passes through the spatial light modulator and forms images at different positions at the light emergent side of the spatial light modulator. Thus, the hologram display device provided by the embodiments of the present disclosure can form a plurality of three-dimensional images, such that different viewer can view the plurality of three-dimensional images at different positions, thereby increasing the viewing range of the hologram display device.

BRIEF DESCRIPTION OF THE DRAWINGS

The accompanying drawings are provided for better understanding of the present disclosure, and constitute a part of the specification. The accompanying drawings are for the purpose of explaining the present disclosure, but are not intended to limit the present disclosure, wherein.

DETAILED DESCRIPTION

Embodiments of the present disclosure will be described in detail below with reference to the accompanying drawings. It should be noted that, the embodiments described herein are only for the purpose of explaining and illustrating the present disclosure, but are not intended to limit the present disclosure.

Figure 1:
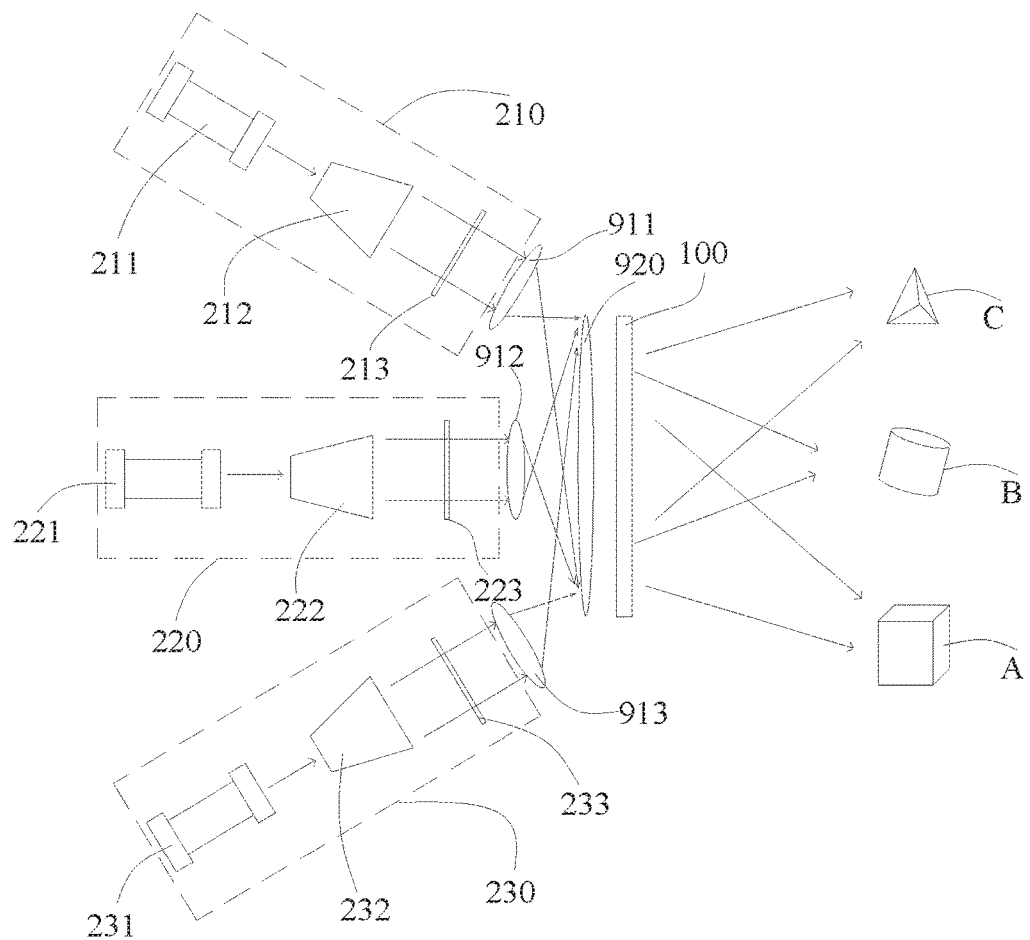
FIG. 1 is a schematic diagram showing a structure of a hologram display device according to a first embodiment of the present disclosure.

As shown in FIG. 1, a first embodiment of the present disclosure provides a hologram display device. The hologram display device includes a spatial light modulator 100. The hologram display device further includes a lens assembly including lenses 911, 912, 913, and 920, and a plurality of backlights 210, 220, and 230. The plurality of backlights are provided at a light incident side of the spatial light modulator 100, and the lens assembly is provided between the plurality of backlights and the spatial light modulator 100. The plurality of backlights are capable of emitting light having different directions towards the lenses 911, 912 and 913 of the lens assembly, respectively, and the lens assembly is capable of guiding received light having different directions to the spatial light modulator 100. The spatial light modulator 100 is configured to form images at different positions at a light emergent side of the spatial light modulator 100 according to the light having different directions from the lens assembly, respectively.

In the present disclosure, the number of the backlights is not specifically limited. As an example, in the embodiment as shown in FIG. 1, the hologram display device includes three backlights, which are backlights 210, 220, and 230, respectively.

Since the light outgoing directions of the plurality of backlights are different from each other, light emitted from the plurality of backlights passes through the spatial light modulator 100 and forms images at different positions (also referred to as viewable regions) at the light emergent side of the spatial light modulator 100. Thus, the hologram display device provided by the present disclosure can form a plurality of three-dimensional images, such that different viewer can view the plurality of three-dimensional images at different positions, thereby increasing the viewing range of the hologram display device.

In the present disclosure, the plurality of three-dimensional images which are displayed are not specifically limited. For example, a plurality of identical images may be formed, or a plurality of images which are different from each other may be formed. In the embodiment as shown in FIG. 1, an image formed by the hologram display device in a case where the backlight 210 emits light is image A, an image formed by the hologram display device in a case where the backlight 220 emits light is image B, and an image formed by the hologram display device in a case where the backlight 230 emits light is image C, wherein the image A, the image B, and the image C are different from each other.

In the present disclosure, a refresh frequency of the spatial light modulator 100 and a frequency at which each of the backlights irradiates the spatial light modulator 100 are not specifically limited, as long as the hologram display device is allowed to correctly display an image formed by light emitted by each of the plurality of backlights.

As an example, the spatial light modulator 100 may be a liquid crystal display panel configured to display images according to coded information obtained by computation. To obtain a holographic display image having a high resolution, optionally, the spatial light modulator may have a PPI not less than 3,000.

In an example, the refresh frequency of the spatial light modulator 100 and the frequency at which each of the backlights irradiates the spatial light modulator satisfy an equation of $$f=F/n,$$

where f is the frequency at which each of the backlights irradiates the spatial light modulator 100, F is the refresh frequency of the spatial light modulator 100, and n is the number of the plurality of backlights.

In general, the refresh frequency of the spatial light modulator 100 may be 120 Hz.

As an exemplary embodiment of the present disclosure, the number of the plurality of backlights may be three. In this case, the frequency at which each of the backlights irradiates the spatial light modulator 100 is 40 Hz.

Figure 3:
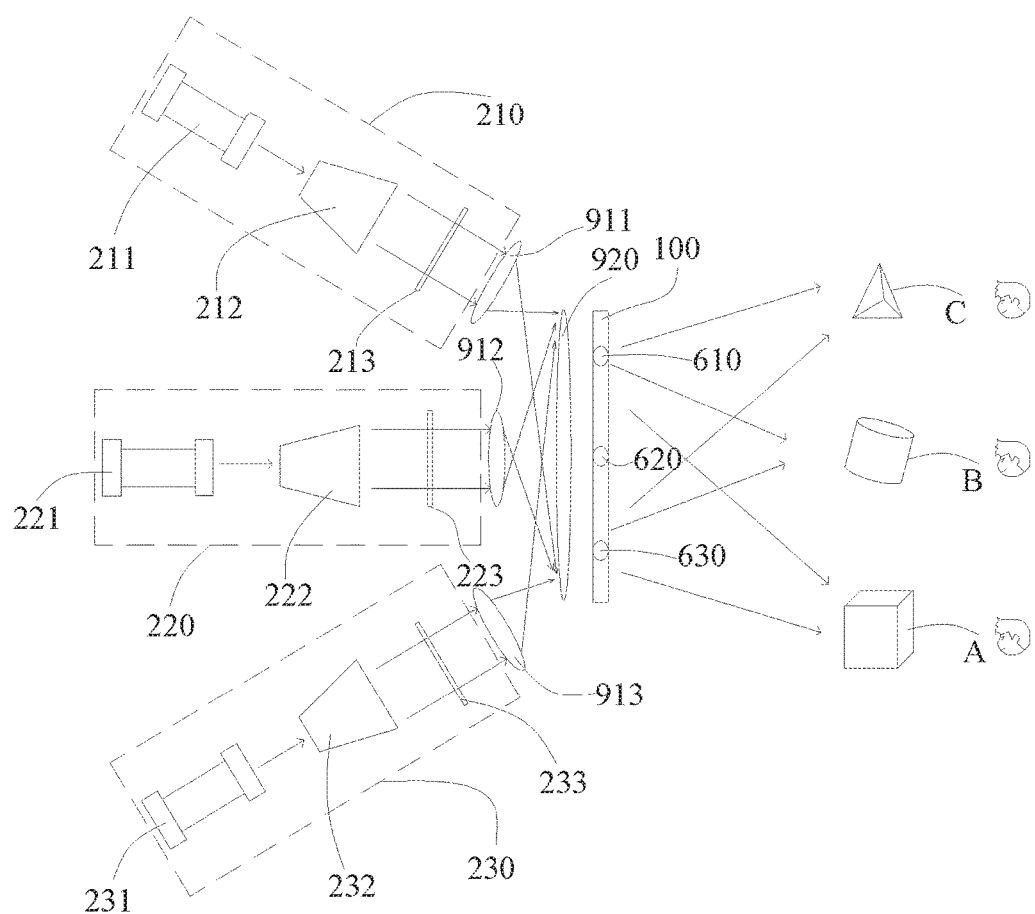
FIG. 3 is a schematic diagram showing a structure of a hologram display device according to a second embodiment of the present disclosure.
Figure 5:
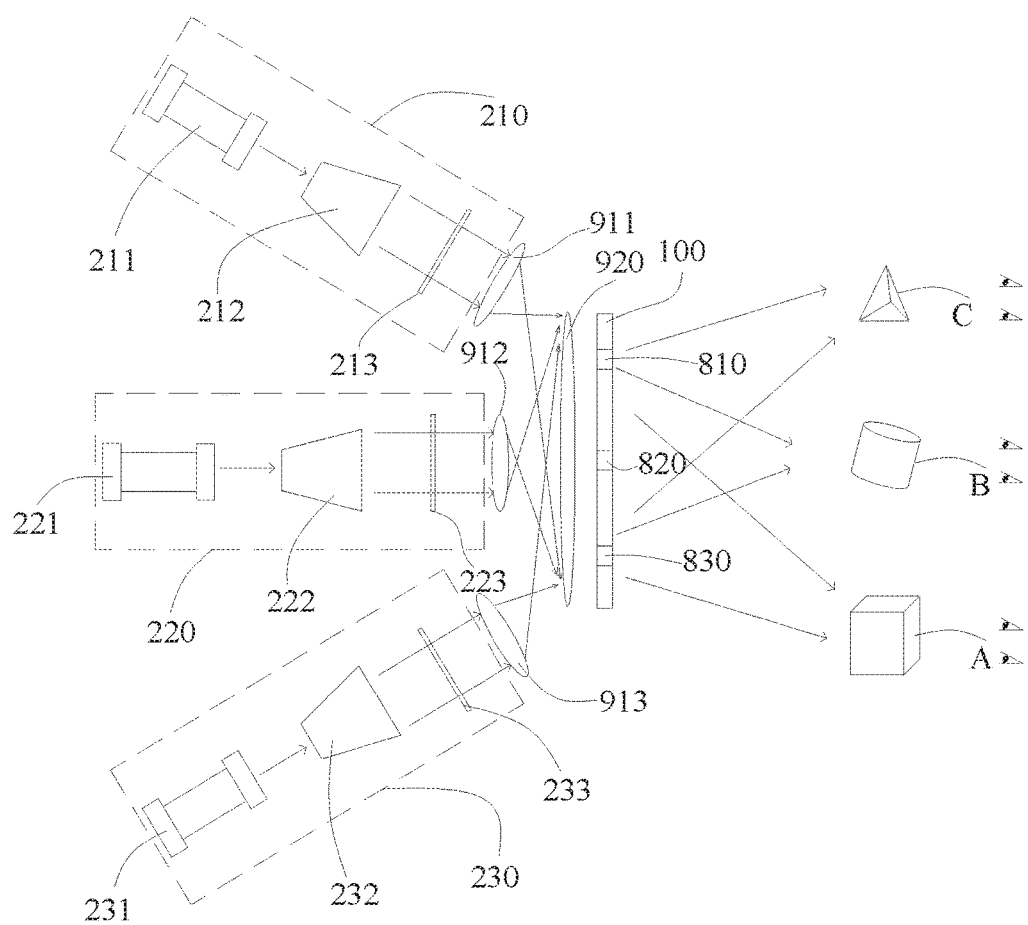
FIG. 5 is a schematic diagram showing a structure of a hologram display device according to a third embodiment of the present disclosure.

In the present disclosure, a structure of each of the backlights is not specifically limited. For example, each of the backlights may include a light emitting assembly capable of emitting parallel surface coherent light towards the spatial light modulator. The lens assembly includes a plurality of first lenses (which are the first lenses 911, 912, and 913 as shown in FIGS. 1, 3, and 5) having a one-to-one correspondence to the plurality of backlights and a second lens 920 provided between the plurality of first lenses and the spatial light modulator 100. Each of the first lenses is capable of guiding parallel surface coherent light emitted from a corresponding backlight to a predetermined position on the second lens 920, and the second lens 920 is capable of guiding light emitted from respective first lenses to the spatial light modulator 100.

In the embodiments as shown in FIGS. 1, 3, and 5, the backlight 210 corresponds to the first lens 911, the backlight 220 corresponds to the first lens 912, and the backlight 230 corresponds to the first lens 913.

In the present disclosure, the backlights may be controlled to emit light in sequence, and a method for controlling the backlights to emit light in sequence is not specifically limited. For example, an order in which the backlights emit light may be controlled.

Optionally, for ease of control, each of the backlights may further include a shutter provided between a light outgoing surface of the light emitting assembly of the backlight and the first lens corresponding to the backlight.

Light emitted from each of the light emitting assemblies can irradiate the spatial light modulator 100 when the corresponding shutter is turned on, but is blocked when the corresponding shutter is turned off. Thus, the shutters of the plurality of backlights may be controlled to be turned on in sequence, so that light emitted from each of the plurality of backlights irradiates the spatial light modulator 100 in sequence.

In the embodiments as shown in FIGS. 1, 3 and 5, the backlight 210 includes a shutter 213, the backlight 220 includes a shutter 223, and the backlight 230 includes a shutter 233. When the shutter 213 is turned on, the shutter 223 and the shutter 233 may be turned off, and the image A may be formed at the light emergent side of the spatial light modulator 100. When the shutter 223 is turned on, the shutter 213 and the shutter 233 may be turned off, and the image B may be formed at the light emergent side of the spatial light modulator 100. When the shutter 233 is turned on, the shutter 213 and the shutter 223 may be turned off, and the image C may be formed at the light emergent side of the spatial light modulator 100.

In the present disclosure, a specific structure of each of the light emitting assemblies is not limited, as long as each of the light emitting assemblies can emit parallel surface coherent light.

As an exemplary embodiment of the present disclosure, each of the light emitting assemblies may include a laser and a beam expander. An emitting terminal of the laser faces a light incident surface of the beam expander, and a light emergent surface of the beam expander faces the shutter. The laser can emit coherent light, and the beam expander can expand the coherent light emitted from the laser into parallel surface coherent light.

For example, in the embodiments as shown in FIGS. 1, 3, and 5, the light emitting assembly of the backlight 210 includes a laser 211 and a beam expander 212. The light emitting assembly of the backlight 220 includes a laser 221 and a beam expander 222. The light emitting assembly of the backlight 230 includes a laser 231 and a beam expander 232.

Figure 2:
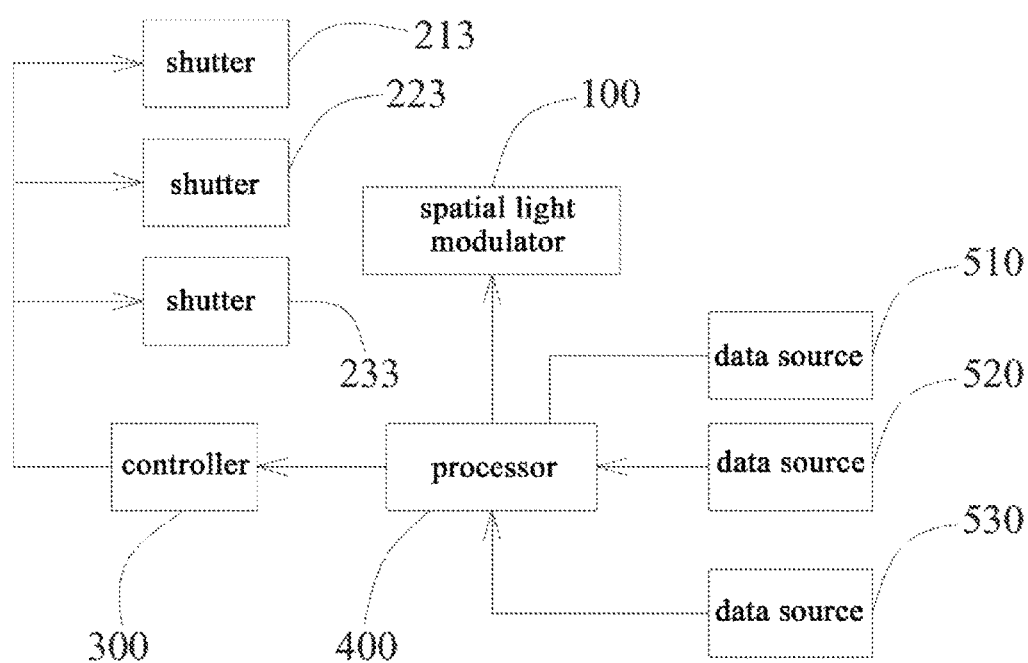
FIG. 2 is a schematic block diagram of the hologram display device shown in FIG. 1.

For ease of controlling each of the shutters to be in a turn-on state or in a turn-off state, optionally, the hologram display device may further include a controller 300, and an output terminal of the controller 300 is connected to control terminals of the plurality of shutters, respectively, to control the plurality of shutters to be turned on in sequence, as shown in FIG. 2.

As described above, the hologram display device can display a plurality of images at the same time. Thus, the hologram display device may include data sources which provide respective display signals. In a case where the hologram display device displays a same image at different positions, the hologram display device may include only one data source. It should be noted that, a photographing process (or a recording process) of a holographic three-dimensional image (also referred to as a stereoscopic image) may be implemented by a processor or a computer by performing a simulation. Information of a phase and an amplitude of a light wave of an object may be obtained by Computer Generated Holography (CGH), and the obtained information of the phase and the amplitude may be stored in a memory as each of the data sources.

To display different images at different positions, optionally, the hologram display device may further include a processor 400 and a plurality of data sources each providing an image signal, as shown in FIG. 2. The plurality of data sources have a one-to-one correspondence to the plurality of backlights, and output terminals of the plurality of data sources are connected to a plurality of input terminals of the processor 400, respectively. A first output terminal of the processor 400 is connected to an input terminal of the spatial light modulator 100, and a second output terminal of the processor 400 is connected to an input terminal of the controller 300. The processor 400 can transform an image signal provided by a data source into coded information and can send the coded information to the spatial light modulator 100 at the time when a corresponding one of the backlights irradiates the spatial light modulator 100.

Figure 4:
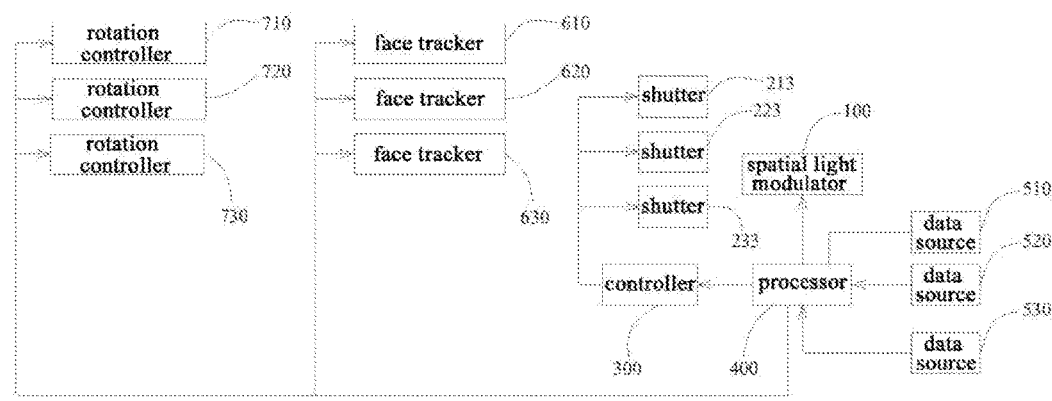
FIG. 4 is a schematic block diagram of the hologram display device shown in FIG. 3.
Figure 6:
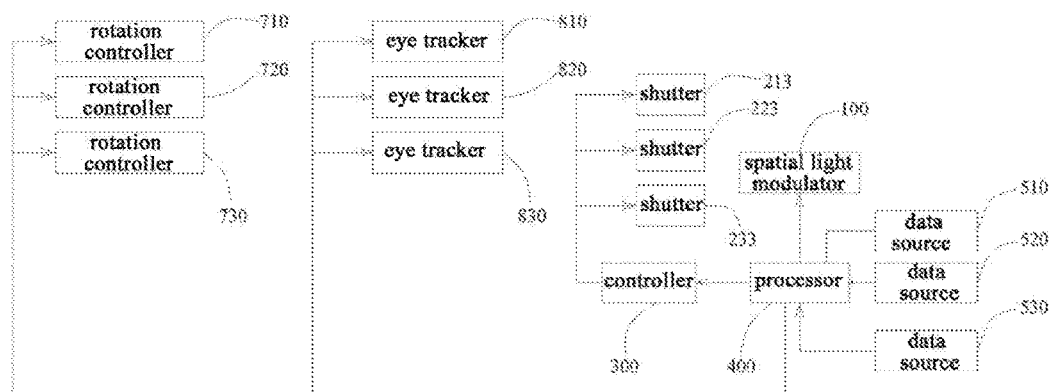
FIG. 6 is a schematic block diagram of the hologram display device shown in FIG. 5.

In the embodiments as shown in FIGS. 2, 4, and 6, the hologram display device may include three data sources, which are a data source 510, a data source 520, and a data source 530.

To provide viewers with better viewing effects, optionally, in the embodiments as shown in FIGS. 3 and 4, the hologram display device may further include at least one rotation controller and at least one face tracker. The rotation controller is configured to adjust a light outgoing direction of each of the backlights. Each of the at least one face tracker corresponds to a predetermined region of the light emergent side of the spatial light modulator 100, and is configured to determine a position of a face of a viewer in the predetermined region and to send information of the position of the face of the viewer to the rotation controller. After receiving the information of the position, the rotation controller controls at least one of the backlights to rotate, so that a light outgoing direction of the at least one of the backlights matches the position of the face of the viewer detected by each of the at least one face tracker. For example, the rotation controller may be an actuator, and may be connected to the backlights, so as to cause each of the connected backlights to rotate around a horizontal axis and/or a vertical axis by a desired angle. As a result, a light outgoing direction of each of the connected backlights matches the position of the face of the viewer detected by each of the at least one face tracker. The rotation controller and the at least one face tracker may be connected to the processor 400, and may operate under the control of the processor 400, as shown in FIG. 4.

As described above, each face tracker can detect the position of a face of a viewer in the region corresponding to the face tracker, and each rotation controller can control the connected backlights to rotate. After each of the backlights rotates, the light outgoing direction thereof changes. In this way, a viewable range can be adjusted, so that a viewer in the predetermined region can view an image.

In other words, after a position of a viewer is determined by the face tracker, a light outgoing direction of the backlight may be adjusted according to the position of the viewer, so that the viewer is within a light outgoing range of at least one of the backlights. As a result, a viewable range of the hologram display device may be increased.

In the present disclosure, positions at which the at least one face trackers are provided are not specifically limited. For example, the face trackers may be provided on a light emergent surface of the spatial light modulator 100 or on a frame of the spatial light modulator 100.

To obtain information of positions of faces of viewers at different positions conveniently, optionally, the face trackers may be embedded in the spatial light modulator 100.

Each of the rotation controllers may control one backlight to rotate, or may control the plurality of backlights to rotate.

To improve the viewer's viewing experience, optionally, the hologram display device may include a plurality of rotation controllers and a plurality of face trackers, and each of the backlights corresponds to one of the rotation controllers and one of the face trackers. Each of the rotation controllers can, after receiving the information of the position sent by a corresponding face tracker, control a corresponding backlight to rotate, so that a light outgoing direction of the corresponding backlight matches the position of the face of the viewer detected by the corresponding face tracker.

In a case where the hologram display device includes the plurality of face trackers, faces of viewers at different positions in front of the spatial light modulator 100 may be tracked, and respective backlights may be controlled so that light outgoing directions of the corresponding backlights matches the positions of the corresponding viewers.

In a case where the hologram display device includes the plurality of face trackers, the plurality of face trackers may be arranged with a same interval therebetween, so that different face trackers correspond to different regions.

In the embodiments as shown in FIGS. 3 and 4, the hologram display device includes three face trackers, which are a face tracker 610, a face tracker 620, and a face tracker 630, respectively. The hologram display device may further include three rotation controllers, which are a rotation controller 710, a rotation controller 720, and a rotation controller 730, respectively.

Each of the backlights corresponds to one of the rotation controllers and one of the face trackers. In the embodiments as shown in FIGS. 3 and 4, the backlight 210 corresponds to the rotation controller 710 and the face trackers 610, the backlight 220 corresponds to the rotation controller 720 and the face trackers 620, and the backlight 230 corresponds to the rotation controller 730 and the face trackers 630.

As another embodiment of the present disclosure, optionally, the hologram display device may further include at least one rotation controller and at least one eye tracker. The rotation controller is configured to adjust a light outgoing direction of at least one of the backlights. Each of the at least one eye tracker corresponds to a predetermined region of the light emergent side of the spatial light modulator 100, and is configured to determine positions of eyes of a viewer in the predetermined region and to send information of the positions of the eyes of the viewer to the rotation controller. After receiving the information of the positions, the rotation controller controls at least one of the backlights to rotate, so that the at least one of the backlights emit two light rays which alternately enter into the right and left eyes of the viewer, respectively, in a predetermined time period. The at least one rotation controller and the at least one eye tracker may be connected to the processor 400, and may operate under the control of the processor 400, as shown in FIG. 6. Each of the face trackers may be a camera or an infrared sensor. Each of the eye trackers may be replaced with a camera or an infrared sensor.

Each of the plurality of backlights can alternately emit two light rays which enter into the right and left eyes of the corresponding viewer, respectively, and a time interval between the light rays which enter into the right and left eyes of the viewer is in a predetermined range.

The predetermined range refers to a time range of visual persistence of an image in human eyes.

It is easily understood that, each of the plurality of backlights alternately emits two light rays which separately enter into the right and left eyes of the corresponding viewer, respectively, so that the right and left eyes of the corresponding viewer separately receive images. The images received by the two eyes are superposed in the visual system of the viewer, so that the viewer is provided with visual feeling that resolution of the images is increased. Thus, the hologram display device according to the present embodiment may realize a visual effect of higher resolution by using a spatial light modulator of lower resolution.

As an exemplary embodiment of the present disclosure, the hologram display device may include a plurality of rotation controllers and a plurality of eye trackers. Each of the backlights corresponds to one of the rotation controllers and one of the eye trackers. Each of the rotation controllers can, after receiving the information of the positions sent by a corresponding eye tracker, control a corresponding backlight to rotate, so that the corresponding backlight can alternately emit two light rays which enter into the right and left eyes of the viewer, respectively, in the predetermined range.

In the embodiment as shown in FIG. 5, the hologram display device includes three eye trackers, which are an eye tracker 810, an eye tracker 820, and an eye tracker 830, respectively. As shown in FIG. 6, the hologram display device further includes three rotation controllers, which are a rotation controller 710, a rotation controller 720, and a rotation controller 730, respectively. As shown in FIG. 5, each of the backlights corresponds to one of the rotation controllers and one of the eye trackers. As shown in FIGS. 5 and 6, the backlight 210 corresponds to the rotation controller 710 and the eye tracker 810, respectively. The backlight 220 corresponds to the rotation controller 720 and the eye tracker 820, respectively. The backlight 230 corresponds to the rotation controller 730 and the eye tracker 830, respectively.

In the embodiments as shown in FIGS. 5 and 6, left eyes and right eyes of different viewers may be tracked by the eye trackers. Holographic coding may be computed by the processor 400 in real time according to the information of positions of the eyes of the viewers, so that holographic imaging is realized at the positions of the left eyes and the right eyes of the viewers. Further, frame-by-frame display is achieved by controlling the turn-on and turn-off of the shutters, so that a same holographic image is provided to both eyes of a same viewer. By using the present embodiment, a visual effect of higher resolution may be achieved by using a spatial light modulator 100 of lower resolution.

In the present disclosure, a specific arrangement of the eye trackers is not limited. For example, the eye trackers may be provided at any positions on the light emergent surface of the spatial light modulator 100, or may be provided on the frame of the spatial light modulator 100.

For ease of obtaining positions of viewers, optionally, the eye trackers may be embedded in the spatial light modulator. In a case where the hologram display device includes a plurality of eye trackers, the plurality of eye trackers may be arranged with an interval (e.g., a same interval) therebetween.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A hologram display device, comprising a spatial light modulator, a lens assembly, and a plurality of backlights, wherein
the plurality of backlights are provided at a light incident side of the spatial light modulator, the lens assembly is provided between the plurality of backlights and the spatial light modulator;
the plurality of backlights are configured to emit light having different directions towards the lens assembly, respectively, the lens assembly is configured to guide received light having different directions to the spatial light modulator, and the spatial light modulator is configured to form images at different positions at a light emergent side of the spatial light modulator according to the light having different directions from the lens assembly, respectively;
the lens assembly comprises a plurality of first lenses having a one-to-one correspondence to the plurality of backlights and a second lens provided between the plurality of first lenses and the spatial light modulator, each first lens is configured to guide parallel surface coherent light emitted from a corresponding backlight to a predetermined position on the second lens, and the second lens is configured to guide light transmitted through respective first lenses to the spatial light modulator, and
each backlight comprises a light emitting assembly configured to emit parallel surface coherent light towards the spatial light modulator.

2. The hologram display device according to claim 1, wherein each backlight further comprises a shutter provided between the light emitting assembly of the backlight and the first lens corresponding to the backlight.

3. The hologram display device according to claim 2, further comprising a controller, wherein an output terminal of the controller is connected to control terminals of a plurality of shutters, respectively, to control the plurality of shutters to be turned on in sequence.

4. The hologram display device according to claim 2, wherein each light emitting assembly comprises a laser and a beam expander, an emitting terminal of the laser faces a light incident surface of the beam expander, and a light emergent surface of the beam expander faces the shutter.

5. The hologram display device according to claim 3, further comprising a processor and a plurality of data sources each providing an image signal, wherein the plurality of data sources have a one-to-one correspondence to the plurality of backlights, output terminals of the plurality of data sources are connected to a plurality of input terminals of the processor, respectively, a first output terminal of the processor is connected to an input terminal of the spatial light modulator, a second output terminal of the processor is connected to an input terminal of the controller, and the processor is configured to transform an image signal provided by a data source into coded information and to send the coded information to the spatial light modulator at the time when a corresponding one of the backlights irradiates the spatial light modulator.

6. The hologram display device according to claim 5, further comprising at least one rotation controller and at least one face tracker, wherein the rotation controller is configured to adjust a light outgoing direction of at least one of the backlights, each of the at least one face tracker corresponds to a predetermined region of the light emergent side of the spatial light modulator, and is configured to determine a position of a face of a viewer in the predetermined region and to send information of the position of the face of the viewer to the rotation controller, after receiving the information of the position, the rotation controller controls at least one of the backlights to rotate, so that a light outgoing direction of the at least one of the backlights matches the position of the face of the viewer detected by each of the at least one face tracker.

7. The hologram display device according to claim 6, further comprising a plurality of rotation controllers and a plurality of face trackers, wherein each of the backlights corresponds to one of the rotation controllers and one of the face trackers, each of the rotation controllers is configured to, after receiving the information of the position sent by a corresponding face tracker, control a corresponding backlight to rotate, so that a light outgoing direction of the corresponding backlight matches the position of the face of the viewer detected by the corresponding face tracker.

8. The hologram display device according to claim 6, wherein the at least one face tracker is embedded in the spatial light modulator.

9. The hologram display device according to claim 5, further comprising at least one rotation controller and at least one eye tracker, wherein the rotation controller is configured to adjust a light outgoing direction of at least one of the backlights, each of the at least one eye tracker corresponds to a predetermined region of the light emergent side of the spatial light modulator, and is configured to determine positions of eyes of a viewer in the predetermined region and to send information of the positions of the eyes of the viewer to the rotation controller, after receiving the information of the positions, the rotation controller controls at least one of the backlights to rotate, so that the at least one of the backlights emit two light rays which alternately enter into right and left eyes of the viewer, respectively, and a time interval between the light rays which enter into the right and left eyes of the viewer is in a predetermined range.

10. The hologram display device according to claim 9, further comprising a plurality of rotation controllers and a plurality of eye trackers, wherein each of the backlights corresponds to one of the rotation controllers and one of the eye trackers, each of the rotation controllers is configured to, after receiving the information of the positions sent by a corresponding eye tracker, control a corresponding backlight to rotate, so that the corresponding backlight alternately emit two light rays which enter into the right and left eyes of the viewer, respectively.

11. The hologram display device according to claim 9, wherein the at least one eye tracker is embedded in the spatial light modulator.

12. The hologram display device according to claim 1, wherein a refresh frequency of the spatial light modulator and a frequency at which each of the backlights irradiates the spatial light modulator satisfy an equation of $$f=F/n;$$

where f is the frequency at which each of the backlights irradiates the spatial light modulator, F is the refresh frequency of the spatial light modulator, and n is a number of the plurality of backlights.

13. The hologram display device according to claim 12, wherein the refresh frequency of the spatial light modulator is 120 Hz.

14. The hologram display device according to claim 12, wherein the number of the plurality of backlights is three.

* * * * *